United States Patent [19]

Tittes et al.

[11] Patent Number: 4,534,571

[45] Date of Patent: Aug. 13, 1985

[54] CIRCUMFERENTIAL SEALING ASSEMBLY

[75] Inventors: Allan F. Tittes; Kenneth H. Larson; Kennith L. Britton, all of Claypool, Ariz.

[73] Assignee: Inspiration Consolidated Copper Company, Claypool, Ariz.

[21] Appl. No.: 591,122

[22] Filed: Mar. 19, 1984

[51] Int. Cl.[3] .............................................. F16J 33/72

[52] U.S. Cl. .................................... 277/128; 277/151

[58] Field of Search .......................... 277/128, 151, 31

[56] References Cited

U.S. PATENT DOCUMENTS

| | | | |
|---|---|---|---|
| 519,219 | 5/1894 | Allen . | |
| 790,282 | 5/1905 | Brantingham | 277/128 |
| 1,075,214 | 10/1913 | Knudsen . | |
| 1,153,921 | 9/1915 | Howard . | |
| 1,411,157 | 3/1922 | Bradley . | |
| 1,417,373 | 11/1934 | Bowman et al. . | |
| 1,417,588 | 5/1922 | McGregor . | |
| 1,671,161 | 5/1928 | Perks | 277/128 |
| 2,054,017 | 9/1936 | Armstrong et al. | 277/128 |
| 2,469,078 | 5/1949 | Robinson | 277/151 |
| 2,606,016 | 8/1952 | Lindh et al. . | |
| 3,224,877 | 12/1966 | Collin . | |
| 3,467,369 | 7/1969 | Shindo . | |
| 3,606,986 | 9/1971 | Greenberg . | |
| 3,727,587 | 4/1973 | Nebgen . | |
| 3,758,089 | 9/1973 | Kocks . | |
| 3,848,860 | 11/1974 | Maeda et al. . | |
| 4,106,758 | 8/1978 | Leroy et al. . | |
| 4,200,345 | 4/1980 | Walker | 277/128 |
| 4,396,181 | 8/1983 | Tittes et al. . | |

FOREIGN PATENT DOCUMENTS

| | | | |
|---|---|---|---|
| 699858 | 12/1940 | Fed. Rep. of Germany | 277/128 |

*Primary Examiner*—Robert I. Smith
*Attorney, Agent, or Firm*—Pennie & Edmonds

[57] ABSTRACT

A circumferential sealing assembly for use with a generally cylindrical, rotatable liquid metal reaction vessel and a hood which is provided to collect hot gases from the reaction vessel. The sealing assembly comprises a cable and a cable housing. The cable housing is connected to and extends along a circumferential edge or area of the hood. The cable itself extends along, at least partly outside, the cable housing. With one embodiment, the cable is in a tight pressure fit with the reaction vessel. With another embodiment, a sheath encloses an under portion of the cable and the cable pulls the sheath into a tight pressure fit with the reaction vessel.

11 Claims, 13 Drawing Figures

CIRCUMFERENTIAL SEALING ASSEMBLY

TECHNICAL FIELD

The present invention relates to circumferential sealing assemblies for use with converters for refining metals in the liquid state. More particularly, it relates to such assemblies for use with liquid metal converters having cylindrical, horizontal rotating reaction vessels.

BACKGROUND ART

It is the usual practice, when refining many molten metals to add materials, including an air or oxygen blast, to cause reactions which form reaction products with elements which are not desired in the refined metal. Such reaction products will often physically separate from the desired refined molten metal, allowing those products, and the metal, to be poured separately from a vessel in which the refining reactions have occurred.

For example, A. K. Biswas and W. G. Davenport, in *Extractive Metallurgy of Copper,* 2d ed. (1980), available from Pergamon International Library, discuss in detail the converting of copper matte to crude or blister copper which is from 98.5 to 99.5 percent copper. Molten matte may contain a concentration of copper as low as thirty to thirty-five percent. It may also contain iron, sulphur, up to three percent dissolved oxygen, and an assortment of minor amounts of impurity metals, found in the original ore concentrate, but not removed during the smelting process.

This molten matte, charged at approximately 1100° C. into a converter, is oxidized by an air blast, to remove the above-mentioned impurities. The reactions accompanying the refinement are exothermic, raising the temperature of the molten material. In a first slag-forming stage FeS is oxidized to FeO, $Fe_3O_4$ and $SO_2$ gas. Silica Flux is added to combine with the FeO and a portion of the $Fe_3O_4$ to form a liquid slag which floats on top of the molten matte and is poured off at several times during this first stage. Additional matte is added to the converter at intervals, followed by oxidation of a great portion of the FeS in that charge, and pouring off of the slag. When a sufficient amount of copper, in the form of matte is present in the converter, and the matte contains less than one percent FeS, a final slag layer is poured off, and the remaining impure copper is oxidized to blister copper.

Various types of converters have been used in the prior art. One type, referred to as the Peirce-Smith converter, is discussed at page 179 of the reference cited above. This converter includes one opening that is used in connection with, first, filling the converter, second, exhausting large volumes of $SO_2$ bearing gas which are generated during the blowing operation and collected by means of a loose-fitting hood above the body, and third, pouring molten metal from the converter. For pouring purposes, the vessel is mounted on running wheels so that it may be turned about its longitudinal axis until the opening is disposed below the level of the molten metal to permit it to flow out.

A second type of converter, referred to as the Hoboken converter, is shown at page 198 of the above-cited reference. This converter includes a mouth for filling and emptying and a separate opening at the right hand end for escaping fumes. This opening is disposed axially of the converter and between it and the molten metal is a dam structure designated in the drawing on page 198 as a goose neck.

With the Peirce-Smith converter, it is difficult to create a good seal at the single opening because of the pouring of the metal from the opening when emptying the converter. This metal creates a deposit and otherwise deteriorates the opening so that it is difficult to assure that the hood for escaping exhaust will properly seal against the opening. A good seal is desirable to prevent noxious gases from escaping, and to prevent the dilution of the $SO_2$ component by air, which is undesirable when the $SO_2$ is used to produce sulfuric acid in an auxiliary process.

The problem of the Peirce-Smith converter is somewhat eliminated by the Hoboken converter. The goose neck is spaced to permit only gasses to flow over the dam out the exhaust opening. This is a rather complicated, expensive structure, however, and during turning of the converter, liquid metal may reach the exhaust opening and cause deterioration of it and its associated structures. In addition, the presence of the dam decreases the capacity of the reaction vessel.

A third converter is disclosed in U.S. Pat. No. 4,396,181. This converter includes a generally cylindrical horizontal hollow reaction vessel which rotates on its horizontal axis. A first opening in the vessel is used to charge molten material which is to be refined into the vessel. A second opening is used to exhaust hot gases produced in the refinement process, usually as a result of an air blast which is provided to the molten material. The second opening is longitudinally and circumferentially displaced from the first opening, with the circumferential displacement being sufficient to prevent liquid metal from pouring from the second opening when the vessel is rotated from a first position for charging material into the first opening to a second position for pouring the contents of the vessel from the first opening.

A hood which is in circumferential and longitudinal contact with the converter body covers an area of the body sufficient to allow capture of the hot exhaust gases as the converter is rotated from the first position to the second position. A circumferential sealing assembly including refractory material, a tensioning band, a retaining band, and a plurality of spring clips is used to seal the circumferentially extending interface between the hood and the reaction vessel. This assembly, while effective, is somewhat complex and expensive.

DISCLOSURE OF THE INVENTION

The present invention relates to a sealing assembly for use with liquid metal refinement converters of the type having a generally cylindrical horizontal hollow reaction vessel which rotates on its horizontal axis. In particular, this invention relates to a sealing assembly for sealing a circumferential area or interface between such a converter and a hood that is provided to receive hot gases from the converter.

The sealing assembly of the present invention includes a cable and a cable housing. The cable housing is connected to and extends along a circumferential edge of the hood. The cable itself extends along, at least partly outside, the cable housing. With one embodiment, the cable is in a tight pressure fit with the reaction vessel. With another embodiment, a sheath encloses an under portion of the cable, and the cable pulls the sheath into a tight pressure fit with the reaction vessel. Both embodiments area very simple and inexpensive to make, install and maintain. At the same time, the sealing assemblies of this invention are effective and highly reliable.

BRIEF DESCRIPTION OF THE DRAWINGS

Additional features and advantages of the invention may be readily ascertained by reference to the following description and appended drawings in which.

BEST MODE FOR CARRYING OUT THE INVENTION

Figure 1:
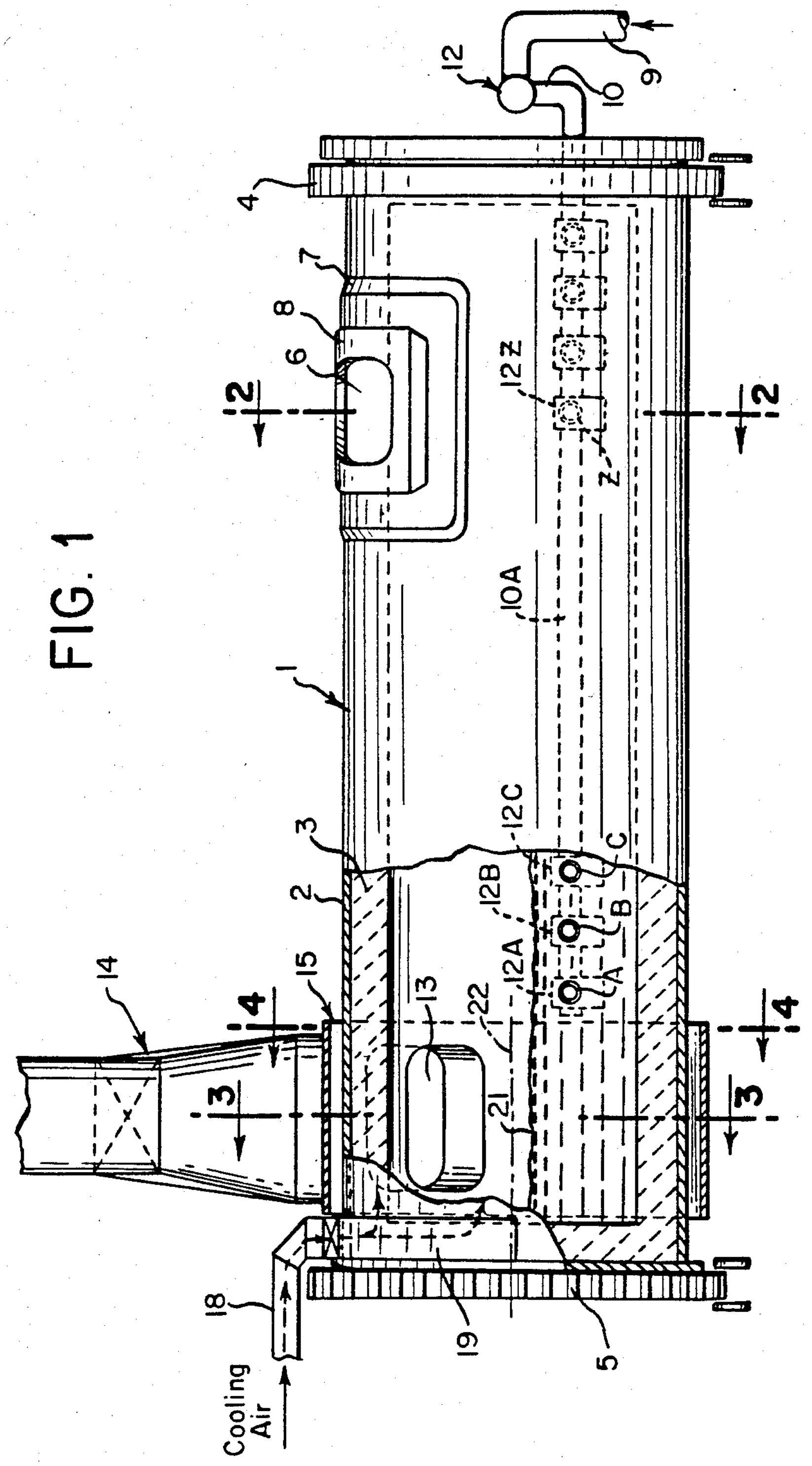
FIG. 1 is a side elevation of a reaction vessel and a hood with which this invention may be used.

FIG. 1 shows a generally cylindrical hollow reaction vessel 1 formed of a steel shell 2 and lined with refractory brick 3, of a type well known in the art. The reaction vessel is approximately forty six feet long and approximately fourteen feet in outer diameter, but it is recognized that other dimensions may be used, depending on the quantity of material which must be refined.

Vessel 1 is supported at one end in riding ring 4, which is essentially a bearing. This bearing must be capable of supporting the weight of vessel 1, while withstanding high operating temperatures at the outside of steel shell 2. It must also allow the end of vessel 1 to move longitudinally for a short distance due to thermal expansion and contraction of vessel 1 as its temperature goes from ambient levels to that of the molten material with which it is charged, and back to ambient levels. This is typically a change in length of approximately one and one half inches.

The opposite end of vessel 1 is similarly supported, but expansion is not taken up at this end. In addition, a means for rotating vessel 1 is assocatd with this end. Typically, a gear driven ring 5 is used. A gear, not shown and usually of small diameter, rotated by an appropriate motor, meshes with gear teeth associated with ring 5. Such drive mechanisms are well known in the art.

Liquid metal, or materials needed for refinement are charged into vessel 1 through opening 6. Molten copper matte for example is charged by means of appropriate ladles. A properly positioned chute may be used to charge solid materials such as fluxes. Opening 6 may have an area of approximataly twenty seven square feet. The outside area of shell 2 surrounding opening 6 is reinforced by a metal plate 7. An additional metal structure forms a pouring spout 8, which facilitates pouring of molten materials, such as slag or refined metal from vessel 1. The nature of spout 8 is more readily seen with reference to FIG. 2.

A source of a blast gas, typically air, but possibly oxygen, which facilitates refinement by oxidation of impurities, is provided. The gas is conducted to the vessel by duct 9, which connects to radial extension 10 of manifold 10A, by means of ball joint 12, located on the rotational axis of vessel 1 and therefore permitting rotation of extension 10 with vessel 1. A series of blast pipes for tuyeres A, B, etc. are provided from manifold 10A which comprise a path for air to be injected into vessel 1, below the surface of molten material contained therein. In the preferred embodiment approximately fifty-five tuyeres of two inch inner diameter are used. The amount of blast gas required can readily be calculated by one skilled in the art. It is understood that a smaller or greater number of tuyeres may be used as required. A series of mechanisms 12A, 12B, etc. are provided, one for each tuyere, with a metal ram which can fit into the tuyeres. The mechanism causes these rams to punch solid material which has accumulated in the tuyeres, blocking the flow of the blast back into the vessel.

Figure 3:
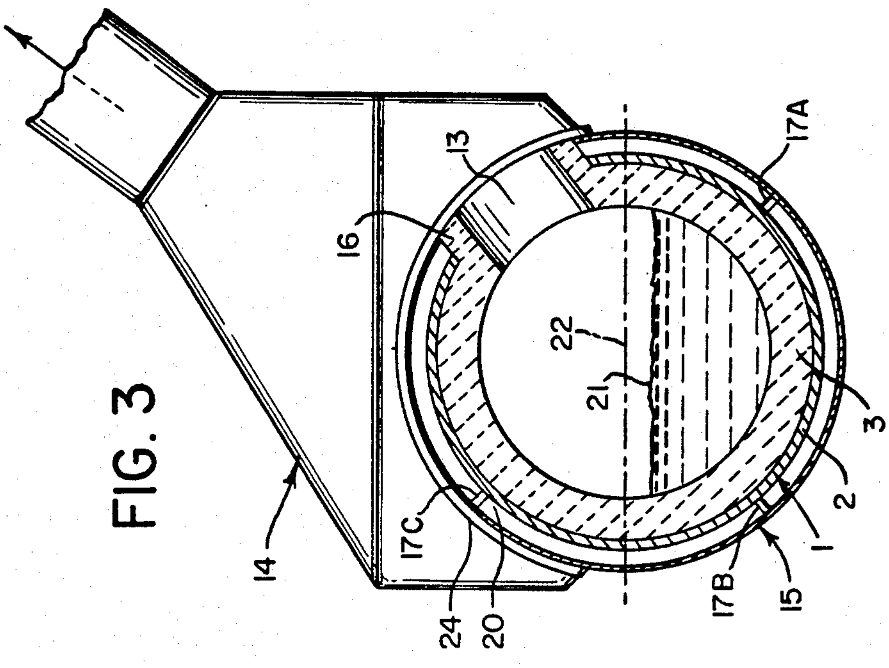
FIG. 3 is a cross section taken along line 3—3 of FIG. 1.
Figure 2:
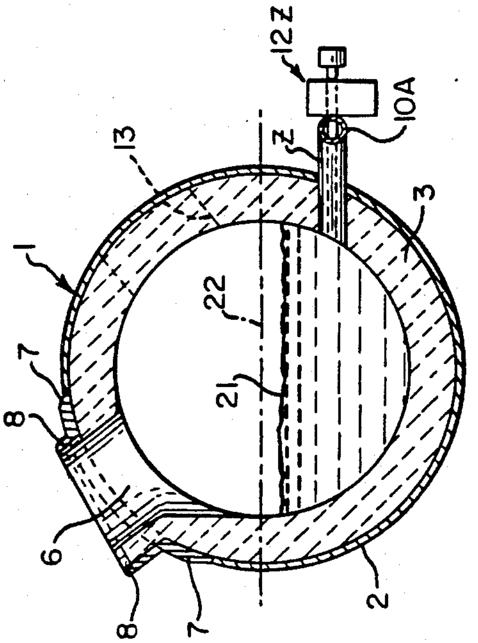
FIG. 2 is a cross section taken along line 2—2 of FIG. 1.

A vent opening 13, through which gas produced by the refining process can escape, with an area of thirty six square feet in this embodiment is provided. This opening is disposed at a point longitudinally displaced, and circumferentially displaced with respect to opening 6, as can be seen by reference to FIG. 2 and FIG. 3. This circumferential displacement of the center line of openings 6 and 13 is chosen so that opening 13 falls under a hood 14 which is in circumferential and longitudinal contact with vessel 1, over an area sufficient to cover opening 13, for the purpose of collecting hot, noxious, but often industrially useful gases which are vented through opening 13, in any operating position to which vessel 1 may be rotated. The circumferential displacement is also sufficient to prevent liquid metal from pouring from opening 13 when vessel 1 is rotated from a first position for charging materials into opening 6 to a second position for pouring the contents of the vessel from opening 6. The position shown in FIG. 2 and FIG. 3 is the charging position. The vessel can be rotated in a counter clockwise direction for approximately 90° to pour material from charge spout 8, which is configured as a half cone to aid the pouring process. In this latter position, opening 13 will remain beneath hood 14.

Hood 14 comprises a casing 14A, a pair of circumferential seals, and a pair of longitudinal seals. While hood 14 may, in some embodiments, rest on vessel 1, in a preferred configuration, an air cooled jacket 15 is attached to and surrounds vessel 1 and the hood rests on this jacket. In particular, hood 14 is in circumferential contact with jacket 15 by means of circumferential or periphery seal 24 and in longitudinal contact with jacket 15 by means of end seals, shown in FIG. 4 and described below. Jacket 15 reduces the temperature that the seals of hood 14 must be exposed to and prevents deterioration of the metal shell in the area of opening 13 as a result of prolonged exposure to high temperatures. As shown in FIG. 3 a radial extension 16 of opening 13 extends to jacket 15. Jacket 15 includes an opening that is coextensive with the intersection of the inner diameter of extension 16 as that extension contacts jacket 15. This opening is provided so that exhaust gases from vessel 1 may escape through jacket 15 and into hood 14.

Duct 18 of FIG. 1, conducts cool air to duct 19 which is circumferentially spaced slightly from vessel 1 to permit rotation of vessel 1. Duct 19 which is generally of rectangular cross section extending approximately 180 degrees around vessel 1, but possibly extending completely around it, has an opening only in its radially disposed wall adjacent to jacket 15. Jacket 15 has open circumferential ends, as best visualized in FIG. 3. Thus air from duct 19 moves through an opening, not shown, in its radially disposed wall into the region 20 between vessel 1 and jacket 15. This air simply flows through region 20 exiting from the end of jacket 15 opposite the end adjacent duct 19. Struts 17, 17A and 17C serve to position jacket 15 circumferentially with respect to vessel 1. A larger quantity of struts may be used if necessary.

Referring to FIG. 2, the charging, or bath level 21, in the converter is shown with respect to the converter center line 22. While FIG. 2 shows line 21 as being below center line 22, the converter can be charged as high as center line 22 if opening 6 is properly located. During the blowing operation, slag formed will float on molten matte, and may rise to a level approximately six inches above line 22. While the converter may be operated at somewhat lower levels, maximum efficiency is generally achieved with a maximum charge. Spout 8, useful in pouring, is preferably of the shape of an angularly cut cylinder. A typical tuyere Z, connected to manifold 10A, and punched out as necessay by a steel rod associated with mechanism 12Z is shown. Such mechanisms are well known in the art.

Figure 4A:
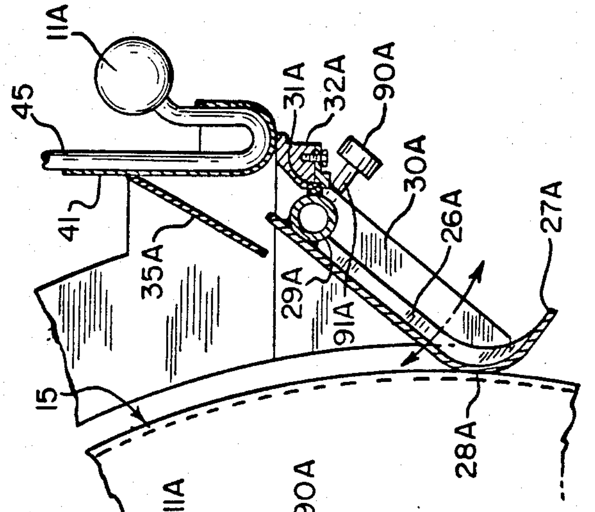
FIG. 4A is an enlarged cross sectional view of the end seal structure of FIG. 4.
Figure 4:
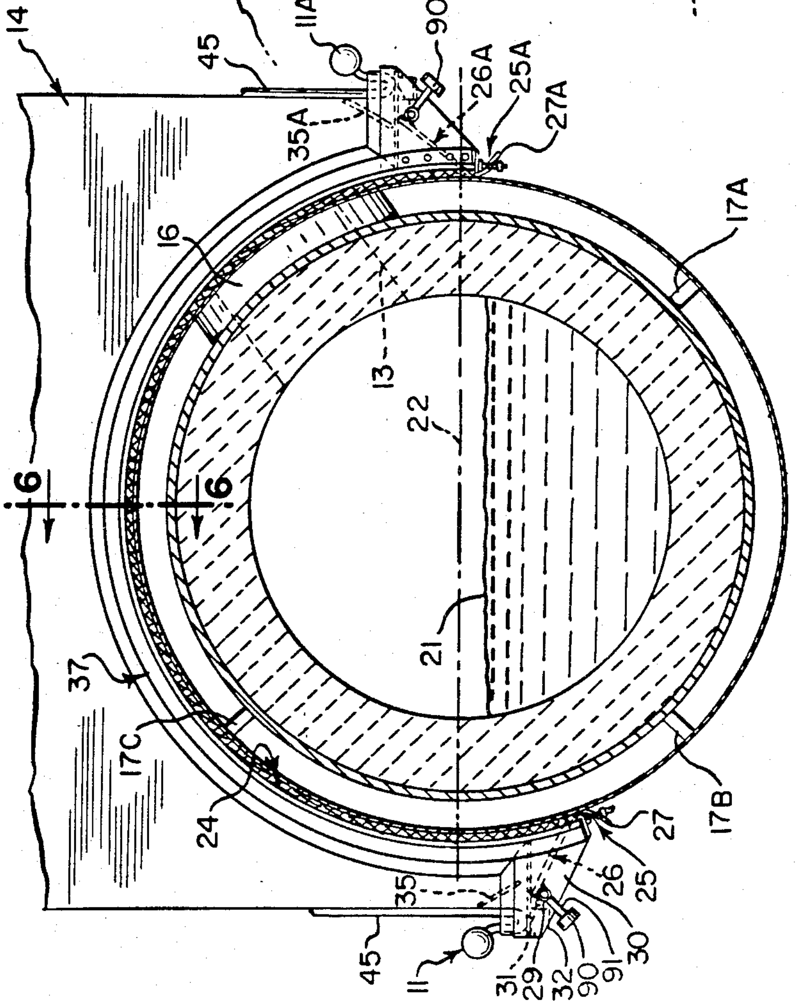
FIG. 4 is an enlarged side elevation of the apparatus shown in FIG. 1 as viewed along line 4—4 of FIG. 1.
Figure 5:
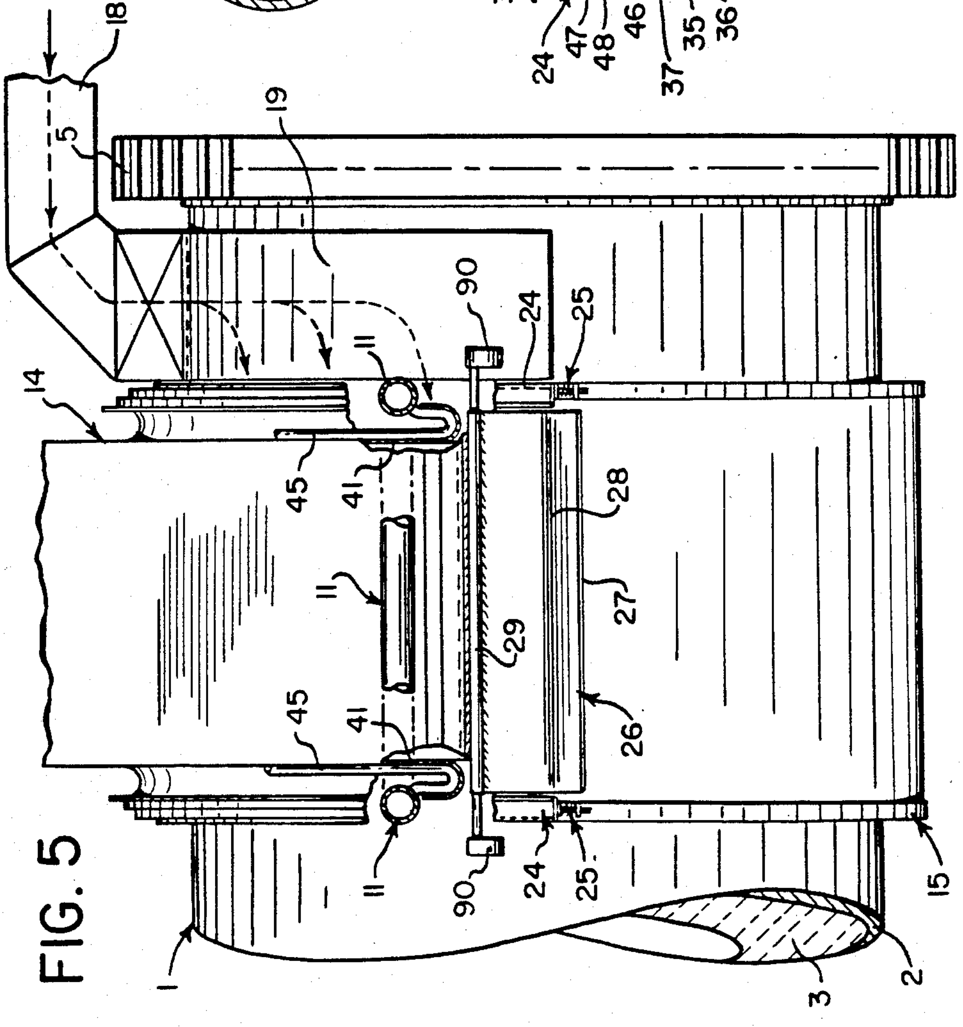
FIG. 5 is a more detailed and enlarged side elevation, viewed from a direction opposite the viewing direction of FIG. 1, showing details of the hood.

In FIG. 4, FIG. 4A and FIG. 5, hood 14 is illustrated in greater detail. Circumferential seal 24, one of two which seal hood 14 to jacket 15 is more fully described below with reference to FIG. 6, and tensioning means 25 and 25A which bias the seals against jacket 15 are more fully described with reference to FIG. 7 and FIG. 8.

Referring to FIG. 4, FIG. 4A and FIG. 5, end seal plates 26 and 26A are metal plates with curved ends 27 and 27A respectively. The distal end of plates 26 and 26A are connected to rods 29 and 29A which are hollow, but could also be solid. These rods rotate within bushings in the wall of seal covers 30 and 30A associated with hood 14. A means such as a spring or preferably counterweights 90 and 90A on extensions 91 and 91A of rods 29 and 29A are provided for rotationally biasing curved convex areas 28 and 28A of plates 26 and 26A in contact with jacket 15. Secondary seals 31 and 31A provide sealing between rods 29 and 29A and seal supports 32 and 32A of the structure of seal covers 30 and 30A.

When vessel 1 rotates, end seal plates 26 and 26A ride on the surface of jacket 15. If any material is deposited on jacket 15 which functions as an elevation of its surface, seal plates 26 and 26A will be forced to rotate away from longitudinal contact with jacket 15 until the material has passed areas 28 or 28A. This will decrease the effectiveness of the seal, allowing some atmospheric gases to enter the hood, but will usually only be of a momentary nature. Shields 35 and 35A are provided to deflect particulate material moving past the radially outer ends of seal plates 26 and 26A thereby preventing material from accumulating behind the seal plates and their associated structures.

The walls of hood 14 are cooled by water circulated through a network of tubes, as represented by tubes 45 located on the outside surface of the hood. Cooling water may be provided from any suitable source, but it is recognized that its temperature may be elevated to the point where high pressures are needed to keep it in the liquid state. For example, water at a temperature of approximately 250° C. and a pressure of 1000 lbs. per square inch may be used. The cooling tubes must then be fabricated from suitable materials and by appropriate techniques well known in the art. Appropriate means of connection to the coolant source, such as feed pipe 11 is used.

During the refinement process hood 14 is operated with a slight negative pressure, typically equal to two and one half inches of water, with respect to atmosphere. This slight suction, provided by means of a variable speed draft fan, well known in the art, prevents the escape of hot noxious gas from opening 6 if it is left uncovered, as is generally required to allow observation of the progress of the refinement, and pouring off of slag produced by repeated charging and refining steps. It is generally undesirable to draw air into opening 6. This is prevented by keeping the suction pressure low, as indicated. This serves to prevent the dilution of the hot exhaust gases which in copper refining contain high percentages of sulfur dioxide, and can be used to manufacture sulfuric acid in an auxiliary plant. This plant may provide the slight suction necessary to reduce the hood pressure.

Hood 14 is preferrably supported by a suitable structure a short distance above vessel 1. This assures that thermal expansion and contraction of the hood structure will not adversely affect the efficiency of the circumferential seals. The hot exhaust gases are cooled, preferrably by heat exchanger. Waste heat may be recovered for use elsewhere, and the gases cooled to a temperature appropriate for further chemical processing.

Figure 6:
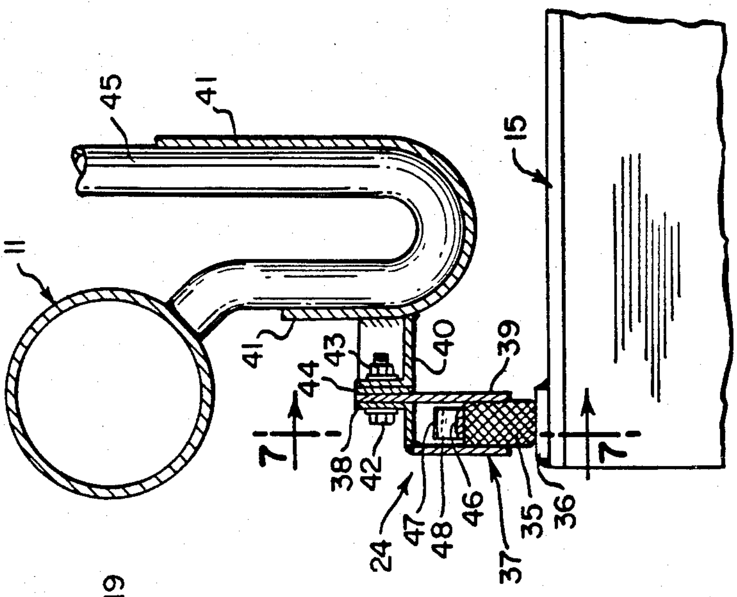
FIG. 6 is an enlarged cross sectional view taken along line 6—6 of FIG. 4 showing details of the hood and a circumferential seal structure.
Figure 7:
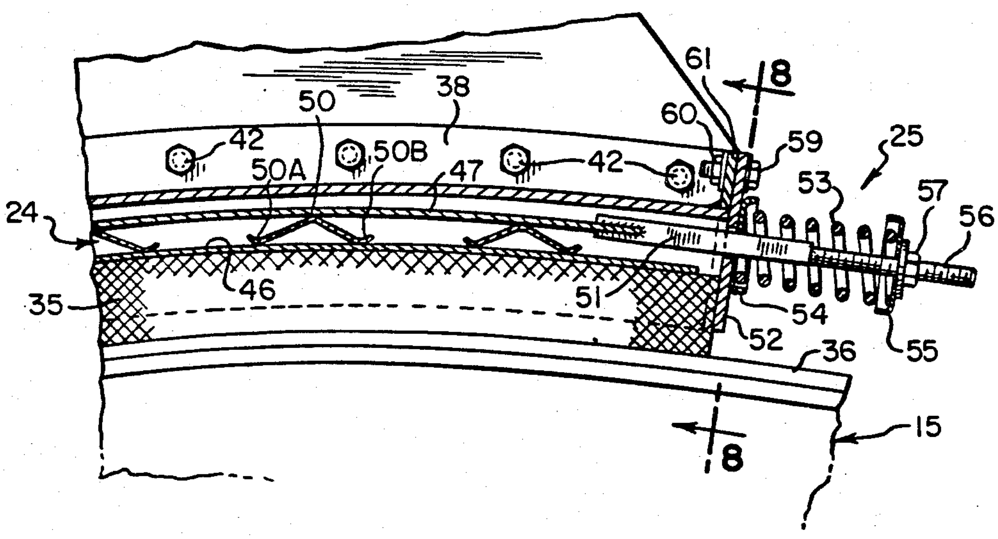
FIG. 7 is a cross sectional view taken along line 7—7 of FIG. 6.

Referring to FIG. 6, a cross section of an area of the hood, showing the structure of one of the two circumferential seals 24 is shown. Seal material 35, a flexible braided packing material of rectangular cross section containing refractory asbestos and graphite components, is forced into contact with a smooth raised surface of a generally rectangular elevation 36 disposed circumferentially around jacket 15. Seal material 35 is disposed in housing 37, which is formed from parts 38 and 39 and is curved to follow the circumference of jacket 15. Housing 37 is fastened at regular intervals to a flange 40, which in turn is connected to a curved extension of wall 41 of hood 14. Bolt 42 and nut 43, typical of many that are used (as can be seen in FIG. 7), serve to fasten parts 38 and 39 to flange 40. A gasket 44 of suitable refractory material, which may be similar to that of seal material 35 is provided between part 39 and flange 40. As previously described, tube 45 through which water is circulated serves to cool wall 41 and its circular extension.

Located within housing 37 is retaining band 46 to which the side of seal material 35 opposite elevation 36 is attached. A tensioning band 47 is also within housing 37, spaced radially outward from retaining band 46 by a plurality of spring clips one of which is shown as spring clip 48. Band 47 is used, when it is pulled into tension by tensioning means 25 (shown in FIG. 4 and described in more detail with reference to FIG. 7 below) to bias seal material 35 against elevation 36.

Referring to FIG. 7, a cross section taken along line 7—7 of FIG. 6, the V-shaped spring clips, only one of which is shown in FIG. 6, are illustrated. While many compression spring means could be used between bands 46 and 47, these spring clips are particularly convenient. The apex 50 of each clip is welded to the tensioning band, leaving the curved ends of the V 50A and 50B free to move slightly with respect to band 46 as band 47 is tightened by tensioning means 25, also illustrated in detail in FIG. 7.

Figure 8:
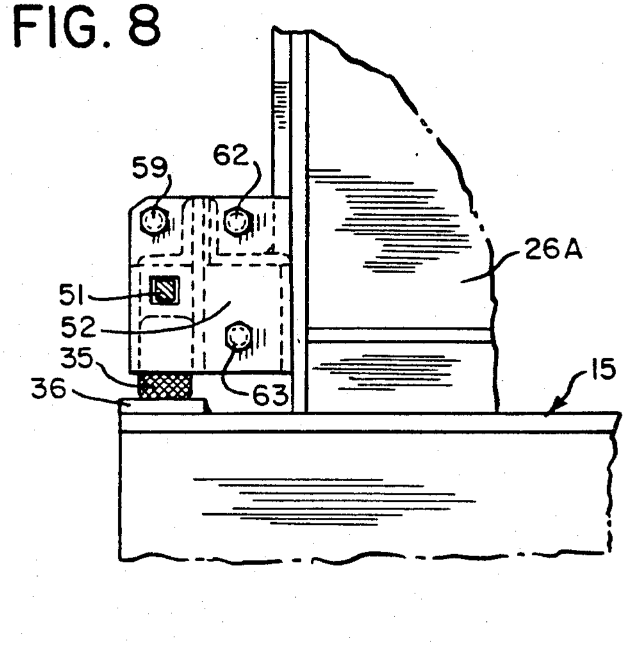
FIG. 8 is a cross sectional view taken along line 8—8 of FIG. 7.

Each end of band 47 is securely fastened in a slot of an elongated member 51. This member is of a noncircular cross section preferably square in the region along its length where it passes through a similarly shaped closely fitting hole in end plate 52, as is best illustrated in FIG. 8. Spring 53 is disposed over member 51 between retainers 54 and 55. A portion of member 51 which comprises the end 56 of member 51 that does not connect to band 47 is of circular cross section, and threaded. A nut 57 moves on this threat and abuts against retainer 55 when the nut is rotated in the direction which causes it to approach end plate 52. Nut 57 thus supplies a tension to band 47 by virtue of the compression of spring 53, which may be one half inch from an uncompressed state due to a load of typically 500 lbs. As is shown in FIG. 4, there are two tightening means, one located at each end of circumferential seal structure 24. In practice the nut 57 associated with each tensioning means may be tightened to provide equal compression of the springs.

Bolt 59 and nut 60 of FIG. 7 are one of three pairs of fasteners, the bolts shown as 59, 62 and 63 in FIG. 8 which serve the function of fastening end plate 52 to a flange 61 connected to housing parts 38 and 39. Also shown in FIG. 8 is end seal plate 26A in contact with jacket 15.

It should be noted that seal material 35 is generally flexible, and will deform should any deposits occur on elevation 36 of jacket 15, as jacket 15 rotates with respect to the seal structure of hood 14. Thus, in contrast to the case of the end seal plates, a reasonably good seal can be maintained despite minor build up of deposits between material 35 and elevation 36. Even small deposits are unlikely however, as material 35 serves to cover the operative area of elevation 36 when it could be exposed to hot exhaust gas, which may contain particles of material that deposit on exposed surfaces.

Figure 9:
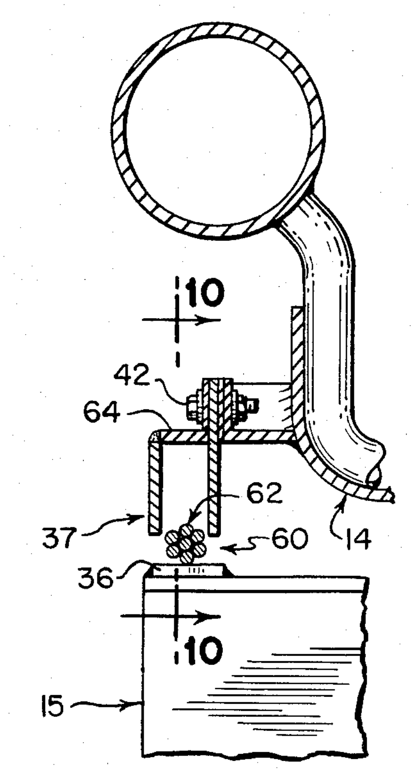
FIG. 9 is a cross sectional view similar to FIG. 6 and showing an alternate circumferential sealing assembly that may be used with the hood.
Figure 10:
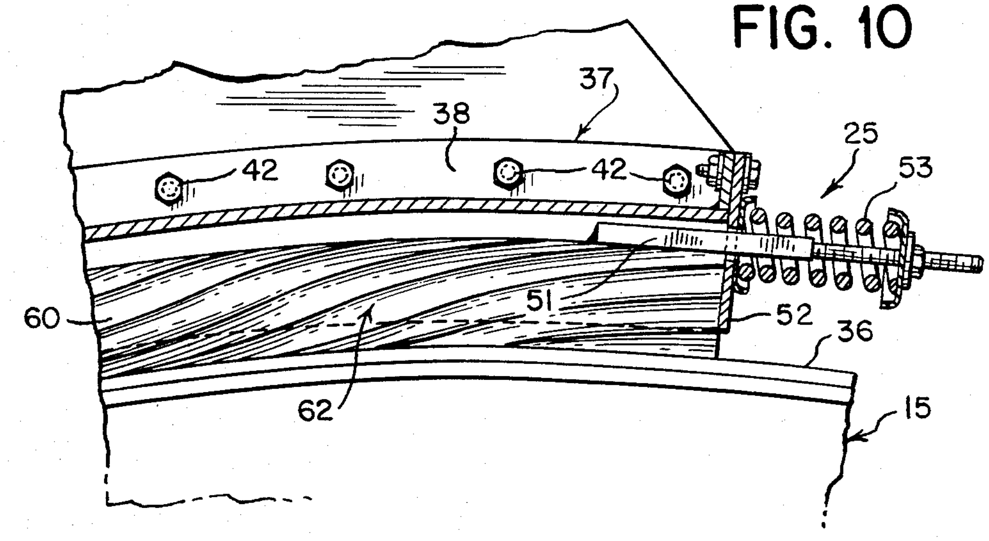
FIG. 10 is a cross sectional view similar to FIG. 7 also illustrating the alternate circumferential sealing assembly shown in FIG. 9.

FIGS. 9 and 10 illustrate a second circumferential sealing assembly 60 that may be used with hood 14. A flexible steel cable 62 extends along housing 37, partly inside and partly outside the housing; and the cable frictionally engages jacket 15, specifically elevation 36 thereof. Cable 62 is woven from course metal wire and has a diameter between one and a quarter and two inches. As shown in FIG. 10, a first circumferential end of cable 62 is connected to tension means 25, and more specifically, that end of the cable is braised directly to elongated member 51 of the tension means. A second circumferential end (not shown in the drawings) of cable 62 is similarly connected to tension means **25*a* discussed above. Tension means 25 and 25*a* bias cable 62 into a tight pressure fit with elevation 36**.

Because cable 62 is directly connected to elongated member 51 of the tension means, this embodiment of the circumferential sealing assembly does not require the various bands and clips 46, 47, and 50 shown in FIG. 7. As a result, in comparison to the circumferential sealing assembly shown in FIG. 7, the construction and operation of circumferential sealing assembly 60 is simpler and less expensive.

Cable 62 is spaced from the top, horizontal portion 64 of housing 37, and the diameter of the cable is less than the inside width of housing 37. In this way, cable 62 loosely extends or fits within housing 37; and the cable is able to move upward and downward within housing 37, allowing the cable to move over any particles or debris on the surface of elevation 36 as jacket 15 rotates beneath hood 14. Spacing cable 62 from top portion 64 of housing 37 also enables the cable and the top portion of the housing to curve differently along or above the top of elevation 36.

Specifically, the cable can conform to the curvature of the outside surface of elevation 36—that is, fit against that surface throughout the entire length of the cable—even though the curvature of that surface may be different than the curvature of the top portion 64 of housing 37. For instance, in a radial plane, such as the plane of FIG. 10, perpendicular to the longitudinal axis of jacket 15, top portion 64 of housing 37 may curve along an arc of a circle, while the top surface of elevation 36 may extend along a slightly oblong or eccentric curve. With a space between top portion 64 of housing 37 and cable 62, the cable is able to extend within the housing and, at the same time, to extend above and in direct contact with the top surface of elevation 36 despite the difference between the curvatures of the elevation and the top portion of the housing.

Figure 12:
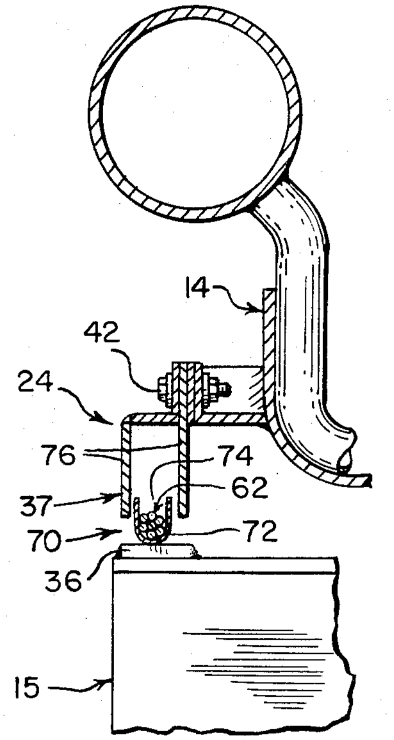
FIG. 12 is an enlarged cross sectional view taken along line 12—12 of FIG. 11 showing details of this third embodiment of the circumferential sealing assembly.
Figure 11:
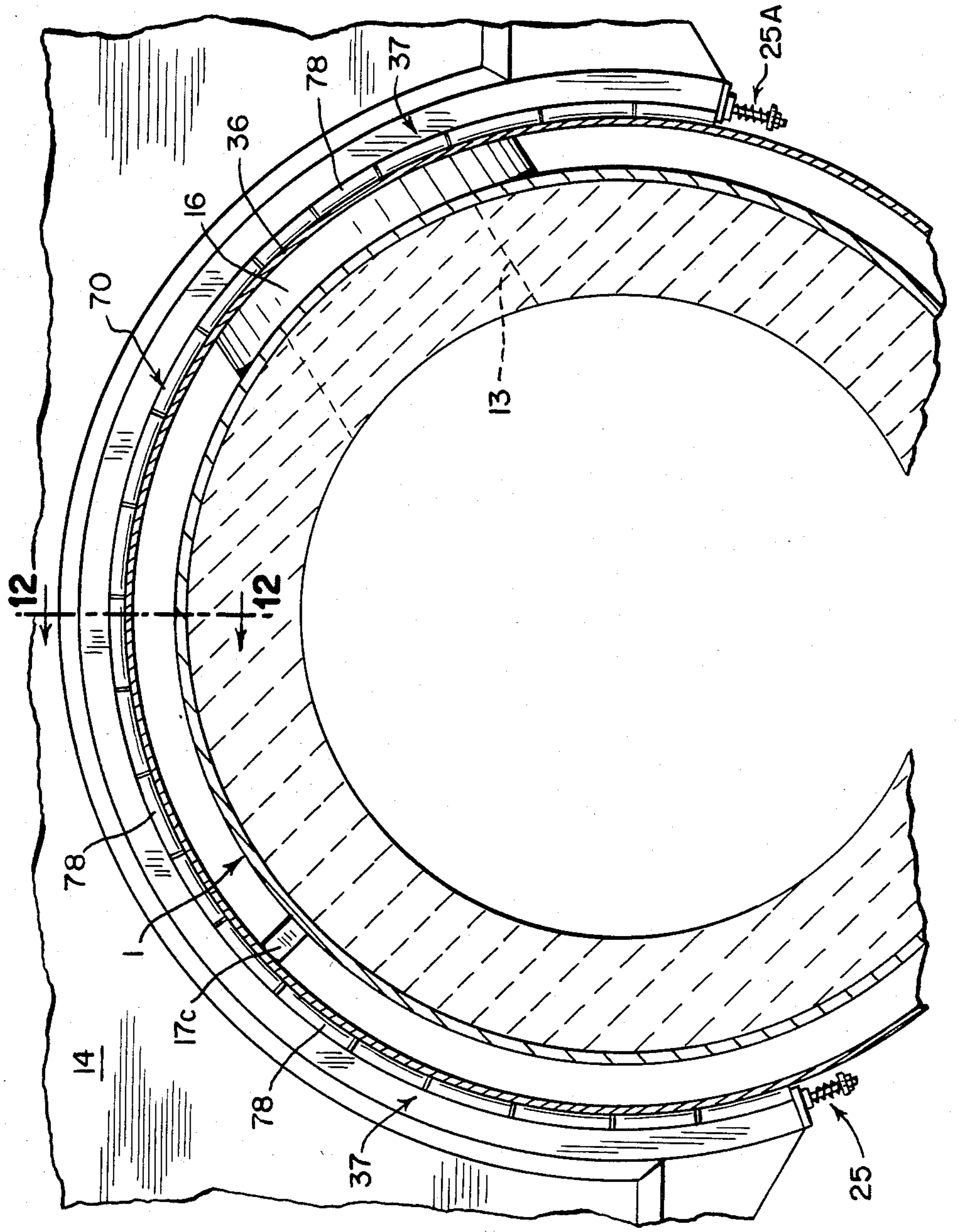
FIG. 11 is an enlarged, partial cross sectional view similar to FIG. 4 showing a third embodiment of the circumferential sealing assembly that may be used with the hood.

FIGS. 11 and 12 illustrate a third circumferential sealing assembly 70. This embodiment of the circumferential sealing assembly is similar to the embodiment shown in FIGS. 9 and 10, and includes a housing 37 and cable 62. The circumferential sealing assembly 70 also includes a sheath 72 that engages elevation 36 of jacket 15 and encloses an under portion of cable 62. More particularly, in assembly, the sheath 72 extends upwardly from elevation 36 into the housing 37; and the sheath defines a circumferentially extending channel 74, with cable 62 extending through this circumferentially extending channel. Tension means 25 and **25*a* are connected to the ends of cable 62 in the same manner discussed above in connection with circumferential sealing assembly 60. Tension means 25 and 25*a* pull cable 62 into a tight pressure fit with the bottom of the sheath 72, forcing the bottom of the sheath into a tight pressure engagement with elevation 36 of jacket 15**.

Using sheath 72 as described above is advantageous in case there is an appreciable space between cable 62 and the sides 76 of housing 37. This space may exist if the diameter of cable 62 is appreciably less than the width of housing 37, or in case the portion of the cable that extends within the housing does not extend completely across the width of the housing. In both cases, sheath 72 will close at least a portion of the space or gap between cable 62 and housing 37, reducing the infiltration of air into the interior of hood 14 through the space or gap between the cable and the housing.

As shown in FIG. 11, sheath 72 is comprised of a plurality of separate sheath segments 78 that are arranged in a circumferentially extending chain. Each individual sheath segment 78 has a U-shaped cross section, as illustrated in FIG. 12. Using a plurality of separate segments 78 to enclose or sheath cable 62 is useful because it facilitates maintaining substantial surface-to-surface contact between sheath 72 and jacket 15 along the entire length of the cable sheath. To elaborate, under normal circumstances jacket 15 is not perfectly round, but rather has a slightly oblong cross sectional shape, and using a plurality of separate segments 78 to sheath cable 62, enables the circumferential chain of sheath segments to conform to the shape of jacket 15 as the jacket is rotated about its own axis.

With reference to FIG. 12, sheath segments 78 tightly fit against the sides of cable 62, but loosely fit within housing 37. This arrangement facilitates putting sealing assembly 70 together. In particular, to assemble the sealing structure, sheath segments 78 are placed on cable 62, with friction between the cable and the sheath segments holding the sheath segments on the cable. Sheath segments 78 and cable 62 are then partly inserted into the interior of housing 37, into the position shown in FIGS. 11 and 12. A loose fit between sheath segments 78 and housing 37 also facilitates relative movement between the sheath segments and the housing, which may occur as jacket 15 rotates beneath the housing.

In addition to the foregoing, it should be pointed out that sheath segments 78 are formed from copper. Copper is preferred because, first, it will well withstand operating temperatures of up to 1500° F., second, it is generally available, and, third, it is relatively soft and thus will not cause significant wear of housing 37 or of the elevation 36 of jacket 15.

Various modifications of the invention in addition to those shown and described herein will become apparent to those skilled in the art from the foregoing description and accompanying drawings.

We claim:

1. A circumferential sealing assembly for use with a cylindrical body and a hood provided to collect hot gases from an opening in said cylindrical body as said cylindrical body is rotated, the circumferential sealing assembly comprising:

(a) a circumferentially extending housing;

(b) means for connecting the housing to a circumferentially extending area of the hood;

(c) a cable extending along, and at least partly outside, the housing for frictionally contacting a circumferentially extending area of the body; and (d) tensioning means connected directly between the housing and cable for pulling the cable taught and into a tight pressure fit with the body.

2. A circumferential sealing assembly according to claim 1 wherein the cable loosely extends within the housing to facilitate movement of the cable therewithin.

3. A circumferential sealing assembly according to claim 2 wherein the tensioning means includes:

(a) an elongated member having a first portion rigidly secured to a circumferential end of the cable; and (b) biasing means connected to the housing, engaging a second portion of the elongated member, and urging the second portion of the elongated member away from said circumferential end of the cable.

4. A circumferential sealing assembly according to claim 3 wherein:

(a) the housing has a U-shaped cross section;

(b) an open side of the housing is positioned to face the body; and (c) the cable extends along the open side of the housing.

5. A circumferential sealing assembly for use with a cylindrical body and a hood provided to collect hot gases from an opening in said cylindrical body as said cylindrical body is rotated, the circumferential sealing assembly comprising:

(a) a circumferentially extending housing;

(b) means for connecting the housing to a circumferentially extending area of the hood;

(c) a cable extending along and at least partly outside the housing;

(d) a sheath (i) enclosing a portion of the cable, and (ii) circumferentially extending along, and at least partly outside, the housing for frictionally engaging a circumferentially extending area of the body; and (e) tensioning means connected between the housing and the cable for pulling the cable taught and into a tight pressure fit with the sheath;

(f) whereby the cable pulls the sheath into a tight pressure fit with the body.

6. A circumferential sealing assembly according to claim 5 wherein the sheath includes a plurality of separate sheath segments arranged in a circumferentially extending chain.

7. A circumferential sealing assembly according to claim 6 wherein each sheath segment has a U-shaped cross section.

8. A circumferential sealing assembly according to claim 7 wherein each sheath segment:

(a) tightly fits against opposed sides of the cable; and (b) loosely extends within the housing.

9. A circumferential sealing assembly according to claim 6 wherein the sheath segments are formed from copper.

10. A circumferential sealing assembly according to claim 9 wherein the cable is woven from course metal wires.

11. A circumferential sealing assembly according to claim 4 wherein the cable is woven from course metal wires.

* * * * *